United States Patent
Zeung

(10) Patent No.: US 9,906,893 B2
(45) Date of Patent: Feb. 27, 2018

(54) METHOD FOR MAKING A HOST PERSONAL COMPUTER ACT AS AN ACCESSORY IN BLUETOOTH PICONET

(71) Applicant: Ping-Shun Zeung, Taipei (TW)

(72) Inventor: Ping-Shun Zeung, Taipei (TW)

(73) Assignee: I/O INTERCONNECT, LTD., Santa Ana, CA (US)

( * ) Notice: Subject to any disclaimer, the term of this patent is extended or adjusted under 35 U.S.C. 154(b) by 0 days.

(21) Appl. No.: 15/183,884

(22) Filed: Jun. 16, 2016

(65) Prior Publication Data

US 2017/0366923 A1    Dec. 21, 2017

(51) Int. Cl.
  *H04W 84/18*  (2009.01)
  *H04W 4/00*   (2018.01)
  *H04W 48/18*  (2009.01)
  *H04W 76/02*  (2009.01)
  *G06F 9/445*  (2018.01)

(52) U.S. Cl.
  CPC .............. *H04W 4/008* (2013.01); *G06F 8/61* (2013.01); *H04W 48/18* (2013.01); *H04W 76/02* (2013.01)

(58) Field of Classification Search
  CPC ..... H04W 4/008; H04W 48/18; H04W 76/02; G06F 8/61
  USPC ................................. 455/41.2, 41.1
  See application file for complete search history.

(56) References Cited

U.S. PATENT DOCUMENTS

| | | | | |
|---|---|---|---|---|
| 7,003,102 B2* | 2/2006 | Kiko | ........................ | H04B 3/54 379/102.04 |
| 7,047,051 B2* | 5/2006 | Sackett | ............. | H04W 52/0229 235/462.14 |
| 7,165,171 B2* | 1/2007 | Zhang | .................. | G06F 9/4401 710/10 |
| 7,215,649 B2* | 5/2007 | Yu | ........................ | H04M 1/7253 370/257 |
| 7,269,183 B2* | 9/2007 | Morris | ................ | H04W 76/025 370/466 |
| 7,436,300 B2* | 10/2008 | Glass | ........................ | G06F 21/31 340/568.1 |
| 7,506,148 B2* | 3/2009 | Zhang | .................. | G06F 9/4401 713/1 |
| 7,596,353 B2* | 9/2009 | Chung | .................. | H04W 84/18 370/368 |
| 7,599,662 B2* | 10/2009 | Ibrahim | ..................... | H03J 7/02 455/41.2 |
| 7,774,027 B2* | 8/2010 | Parikh | .................... | H04W 88/06 455/41.2 |
| 7,801,561 B2* | 9/2010 | Parikh | .................... | H04W 8/005 455/41.2 |
| 8,014,339 B1* | 9/2011 | Moore | .................. | H04W 88/10 370/229 |

(Continued)

*Primary Examiner* — Hai V Nguyen
(74) *Attorney, Agent, or Firm* — Locke Lord LLP; Tim Tingkang Xia, Esq.

(57) ABSTRACT

A method for making a PC act as an accessory device in BLUETOOTH piconet is disclosed. The method includes the steps of: a) providing a BLUETOOTH adapter; b) connecting the BLUETOOTH adapter to the personal computer (PC) with a software program running in an application level; c) installing a custom BLUETOOTH adapter bus driver to be accessed and operated solely by the software program; d) implementing all necessary BLUETOOTH software stack above and including a BLUETOOTH Host to Controller Interface (HCI) profile; and e) the PC serving as a slave device.

5 Claims, 2 Drawing Sheets

(56) References Cited

U.S. PATENT DOCUMENTS

| | | | | |
|---|---|---|---|---|
| 8,050,647 B2* | 11/2011 | Ibrahim | H03J 7/02 | 455/313 |
| 8,073,388 B2* | 12/2011 | Grushkevich | H04W 74/06 | 370/449 |
| 8,095,078 B2* | 1/2012 | Benkert | H04W 8/005 | 455/41.2 |
| 8,190,716 B2* | 5/2012 | Zhodzishsky | G06F 21/85 | 709/220 |
| 8,208,854 B2* | 6/2012 | Winter | H04L 12/66 | 455/41.2 |
| 8,224,247 B2* | 7/2012 | Kidron | G10L 19/167 | 370/473 |
| 8,249,649 B2* | 8/2012 | Tseng | H04W 48/18 | 370/331 |
| 8,287,434 B2* | 10/2012 | Zavadsky | A63B 21/00 | 482/1 |
| 8,346,170 B2* | 1/2013 | Preston | H04M 1/6066 | 370/471 |
| 8,554,138 B2* | 10/2013 | Higgins | H04W 4/10 | 455/41.2 |
| 8,620,379 B2* | 12/2013 | Zhodzishsky | H04L 69/32 | 370/252 |
| 8,700,089 B2* | 4/2014 | Tseng | H04W 48/18 | 370/331 |
| 8,761,671 B2* | 6/2014 | Singer | H04W 80/02 | 370/357 |
| 8,798,541 B1* | 8/2014 | Scott | G06F 9/45545 | 455/41.2 |
| 8,862,399 B2* | 10/2014 | Schmidt | G01C 21/3661 | 701/522 |
| 8,892,175 B2* | 11/2014 | Kirsch | H04M 1/6091 | 455/569.2 |
| 8,897,764 B2* | 11/2014 | Takikawa | H04W 4/001 | 345/157 |
| 8,942,632 B2* | 1/2015 | Shen | H04W 88/04 | 455/41.2 |
| 8,976,724 B2* | 3/2015 | Hauser | H04W 88/04 | 370/279 |
| 9,049,042 B2* | 6/2015 | Tagg | H04L 12/2856 | |
| 9,144,094 B2* | 9/2015 | Bhamidipati | H04N 21/42207 | |
| 9,189,182 B2* | 11/2015 | Jung | G06F 3/1221 | |
| 9,229,854 B1* | 1/2016 | Kuzmin | G06F 12/0246 | |
| 9,237,217 B2* | 1/2016 | Zeung | H04M 1/7253 | |
| 9,306,872 B2* | 4/2016 | Donaldson | H04L 49/20 | |
| 9,383,772 B2* | 7/2016 | Zeung | G06F 1/1632 | |
| 9,544,718 B2* | 1/2017 | Song | H04W 4/008 | |
| 9,710,377 B1* | 7/2017 | Kuzmin | G06F 12/0246 | |
| 2002/0012329 A1* | 1/2002 | Atkinson | G06F 9/4411 | 370/330 |
| 2003/0013411 A1* | 1/2003 | Uchiyama | H04M 1/725 | 455/40 |
| 2003/0068033 A1* | 4/2003 | Kiko | H04B 3/54 | 379/413 |
| 2003/0087681 A1* | 5/2003 | Sackett | H04W 52/0229 | 455/574 |
| 2004/0070488 A1* | 4/2004 | Stockhammer | G06Q 10/02 | 340/5.61 |
| 2004/0198219 A1* | 10/2004 | Malmstrom | G06F 13/4045 | 455/41.1 |
| 2004/0230790 A1* | 11/2004 | Zhang | G06F 9/4401 | 713/2 |
| 2005/0083741 A1* | 4/2005 | Chang | G06F 9/445 | 365/200 |
| 2005/0107103 A1* | 5/2005 | Melpignano | H04J 3/0697 | 455/502 |
| 2005/0152294 A1* | 7/2005 | Yu | H04M 1/7253 | 370/310 |
| 2005/0181729 A1* | 8/2005 | Ibrahim | H03J 7/02 | 455/41.2 |
| 2005/0197064 A1* | 9/2005 | Ibrahim | H04L 25/063 | 455/41.2 |
| 2005/0286466 A1* | 12/2005 | Tagg | H04L 12/2856 | 370/329 |
| 2006/0025075 A1* | 2/2006 | Chung | H04W 84/18 | 455/41.2 |
| 2006/0068760 A1* | 3/2006 | Hameed | H04L 63/061 | 455/412.1 |
| 2006/0105712 A1* | 5/2006 | Glass | G06F 21/31 | 455/41.2 |
| 2006/0116107 A1* | 6/2006 | Hulvey | H04M 1/6066 | 455/411 |
| 2007/0150560 A1* | 6/2007 | Zhang | G06F 9/4401 | 709/220 |
| 2007/0173270 A1* | 7/2007 | Block | H04W 74/06 | 455/507 |
| 2007/0211624 A1* | 9/2007 | Schmidt | H04L 12/5692 | 370/225 |
| 2008/0002758 A1* | 1/2008 | Schmidt | H04W 28/18 | 375/130 |
| 2008/0070504 A1* | 3/2008 | Benkert | H04W 8/005 | 455/41.2 |
| 2008/0081559 A1* | 4/2008 | Parikh | H04W 88/06 | 455/41.2 |
| 2008/0081667 A1* | 4/2008 | Parikh | H04W 8/005 | 455/558 |
| 2008/0207126 A1* | 8/2008 | Grushkevich | H04W 74/06 | 455/41.2 |
| 2008/0274695 A1* | 11/2008 | Muth | G06F 3/038 | 455/41.2 |
| 2008/0287063 A1* | 11/2008 | Kidron | G10L 19/167 | 455/41.2 |
| 2008/0294340 A1* | 11/2008 | Schmidt | G01C 21/3661 | 701/469 |
| 2008/0311852 A1* | 12/2008 | Hansen | H04W 88/06 | 455/41.2 |
| 2009/0061775 A1* | 3/2009 | Warren | H04M 1/6091 | 455/41.2 |
| 2009/0204964 A1* | 8/2009 | Foley | G06F 21/53 | 718/1 |
| 2009/0318081 A1* | 12/2009 | Winter | H04L 12/66 | 455/41.2 |
| 2010/0009673 A1* | 1/2010 | Ibrahim | H03J 7/02 | 455/423 |
| 2010/0197326 A1* | 8/2010 | Ngo | G06F 8/65 | 455/466 |
| 2010/0284380 A1* | 11/2010 | Banerjee | H04W 16/14 | 370/338 |
| 2010/0328216 A1* | 12/2010 | Honda | G06F 3/038 | 345/163 |
| 2011/0034125 A1* | 2/2011 | Preston | H04M 1/6066 | 455/41.2 |
| 2011/0034126 A1* | 2/2011 | Higgins | H04W 4/10 | 455/41.2 |
| 2011/0107117 A1* | 5/2011 | Jung | G06F 3/1221 | 713/300 |
| 2011/0251021 A1* | 10/2011 | Zavadsky | A63B 21/00 | 482/5 |
| 2011/0255454 A1* | 10/2011 | Hauser | H04W 88/04 | 370/311 |
| 2011/0320624 A1* | 12/2011 | Schmidt | G01C 21/3661 | 709/230 |
| 2012/0003973 A1* | 1/2012 | Tseng | H04W 48/18 | 455/426.1 |
| 2012/0142271 A1* | 6/2012 | Zhodzishsky | H04L 67/303 | 455/41.2 |
| 2012/0165062 A1* | 6/2012 | Preston | H04M 1/6066 | 455/518 |
| 2012/0185071 A1* | 7/2012 | Kwon | G01R 33/07 | 700/94 |
| 2012/0203877 A1* | 8/2012 | Bartholomay | H04L 63/0227 | 709/221 |
| 2013/0010764 A1* | 1/2013 | Tseng | H04W 48/18 | 370/335 |
| 2013/0065680 A1* | 3/2013 | Zavadsky | A63B 21/00 | 463/30 |
| 2013/0090931 A1* | 4/2013 | Ghovanloo | G06F 3/011 | 704/275 |

(56) References Cited

U.S. PATENT DOCUMENTS

| | | | | |
|---|---|---|---|---|
| 2013/0137415 A1* | 5/2013 | Takikawa | H04W 4/001 | 455/418 |
| 2013/0288606 A1* | 10/2013 | Kirsch | H04M 1/6091 | 455/41.3 |
| 2014/0120829 A1* | 5/2014 | Bhamidipati | H04N 21/42207 | 455/3.06 |
| 2014/0297900 A1* | 10/2014 | Herbert | G06F 11/3051 | 710/16 |
| 2014/0342669 A1* | 11/2014 | Zeung | H04M 1/7253 | 455/41.2 |
| 2014/0344494 A1* | 11/2014 | Zeung | G06F 1/1632 | 710/303 |
| 2015/0024804 A1* | 1/2015 | Davis | H04M 1/6066 | 455/569.1 |
| 2015/0223272 A1* | 8/2015 | Parkinson | G10L 19/0017 | 455/41.2 |
| 2015/0281853 A1* | 10/2015 | Eisner | H04R 25/505 | 381/312 |
| 2015/0281877 A1* | 10/2015 | Walden | H04W 4/008 | 455/41.2 |
| 2015/0365979 A1* | 12/2015 | Park | H04W 76/007 | 455/404.2 |
| 2016/0012465 A1* | 1/2016 | Sharp | G06Q 20/18 | 705/14.17 |
| 2016/0014545 A1* | 1/2016 | Tian | H04W 8/005 | 455/41.2 |
| 2016/0037389 A1* | 2/2016 | Tagg | H04L 12/2856 | 370/331 |
| 2016/0080896 A1* | 3/2016 | Song | H04W 4/008 | 455/41.2 |
| 2016/0119320 A1* | 4/2016 | Bansal | H04W 12/12 | 705/14.26 |
| 2016/0134996 A1* | 5/2016 | Verma | H04W 4/008 | 709/205 |
| 2016/0150105 A1* | 5/2016 | Shinomiya | H04N 1/00307 | 358/1.15 |
| 2016/0184635 A1* | 6/2016 | Kwon | H04W 4/008 | 455/41.2 |
| 2016/0189143 A1* | 6/2016 | Koeppel | G06K 19/0739 | 705/41 |
| 2016/0249356 A1* | 8/2016 | Pope | H04W 4/008 | |
| 2016/0262056 A1* | 9/2016 | Chen | H04W 28/20 | |
| 2016/0277875 A1* | 9/2016 | Ivanova | H04W 4/008 | |
| 2016/0359925 A1* | 12/2016 | Song | H04L 65/1069 | |
| 2016/0366263 A1* | 12/2016 | Song | H04M 1/7253 | |
| 2017/0006415 A1* | 1/2017 | Song | H04W 4/008 | |
| 2017/0034646 A1* | 2/2017 | Song | H04W 4/008 | |

* cited by examiner

METHOD FOR MAKING A HOST PERSONAL COMPUTER ACT AS AN ACCESSORY IN BLUETOOTH PICONET

BACKGROUND OF THE INVENTION

1. Technical Field

The invention relates to wireless communication between a host computer and peripherals, particularly to connection between BLUETOOTH devices.

2. Related Art

BLUETOOTH is a wireless technology standard for exchanging data over short distances (using short-wavelength UHF radio waves in the ISM band from 2.4 to 2.485 GHz) from fixed and mobile devices, and building personal area networks (PANs). It can connect several devices, overcoming problems of synchronization.

BLUETOOTH is a packet-based protocol with a master-slave structure. One master may communicate with up to seven slaves in a piconet. BLUETOOTH is defined as a layer protocol architecture consisting of core protocols, cable replacement protocols, telephony control protocols, and adopted protocols. Mandatory protocols for all BLUETOOTH stacks are: LMP (Link Management Protocol), L2CAP (Logical Link Control and Adaptation Protocol) and SDP (Service Discovery Protocol). In addition, devices that communicate with BLUETOOTH almost universally can use these protocols: HCI (Host to Controller Interface) and RFCOMM (Radio Frequency Communications).

According to the BLUETOOTH specification, when a personal computer (PC), such as a desktop or a laptop computer, is connected with one or more external devices through BLUETOOTH, the PC generally serves as a BLUETOOTH host device and the external devices serve as BLUETOOTH accessory devices. In other words, a PC itself cannot be a Bluetooth accessory of other Bluetooth device. For example, when a smartphone is connected to a PC through BLUETOOTH, the keyboard, mouse, speaker, and microphone of the PC cannot be used by the smartphone.

To remove this restriction, a common solution is to replace all inherent drivers of the peripherals of the PC with proprietary drivers in a driver level. The proprietary driver will implement the Bluetooth software stack to make the PC serve as Bluetooth accessory for other Bluetooth device such as smart phone. Since the inherent Bluetooth software stack in driver level is replaced and cannot coexist with proprietary driver, some features or API provided by computer OS cannot be used. It will result in some Bluetooth applications based on original inherent software stack not working.

SUMMARY OF THE INVENTION

An object of the invention is to provide a method for making a host personal computer as an accessory in a BLUETOOTH piconet, which can automatically change a BLUETOOTH host PC to act as a BLUETOOTH accessory device. The method proposed in this invention is to connect another Bluetooth adapter to PC and implement Bluetooth software stack in application level on top of the adapter to let PC play Bluetooth accessory role. With this approach, the inherent Bluetooth software stack provided by OS can still work and normally make PC play Bluetooth host role. Therefore, the PC can play both Bluetooth host and accessory roles simultaneously and smoothly.

To accomplish the above object, the method for making a host personal computer as an accessory in BLUETOOTH piconet of the invention includes the steps of:
 a) providing a BLUETOOTH adapter;
 b) connecting the BLUETOOTH adapter to a personal computer (PC) with a software program running in application level;
 c) installing a custom BLUETOOTH adapter bus driver to be accessed and operated solely by the software program;
 d) implementing all necessary BLUETOOTH software stack above and including Bluetooth HCI profiles; and
 e) the PC serving as a BLUETOOTH accessory device.

DETAILED DESCRIPTION OF THE INVENTION

Figure 1:
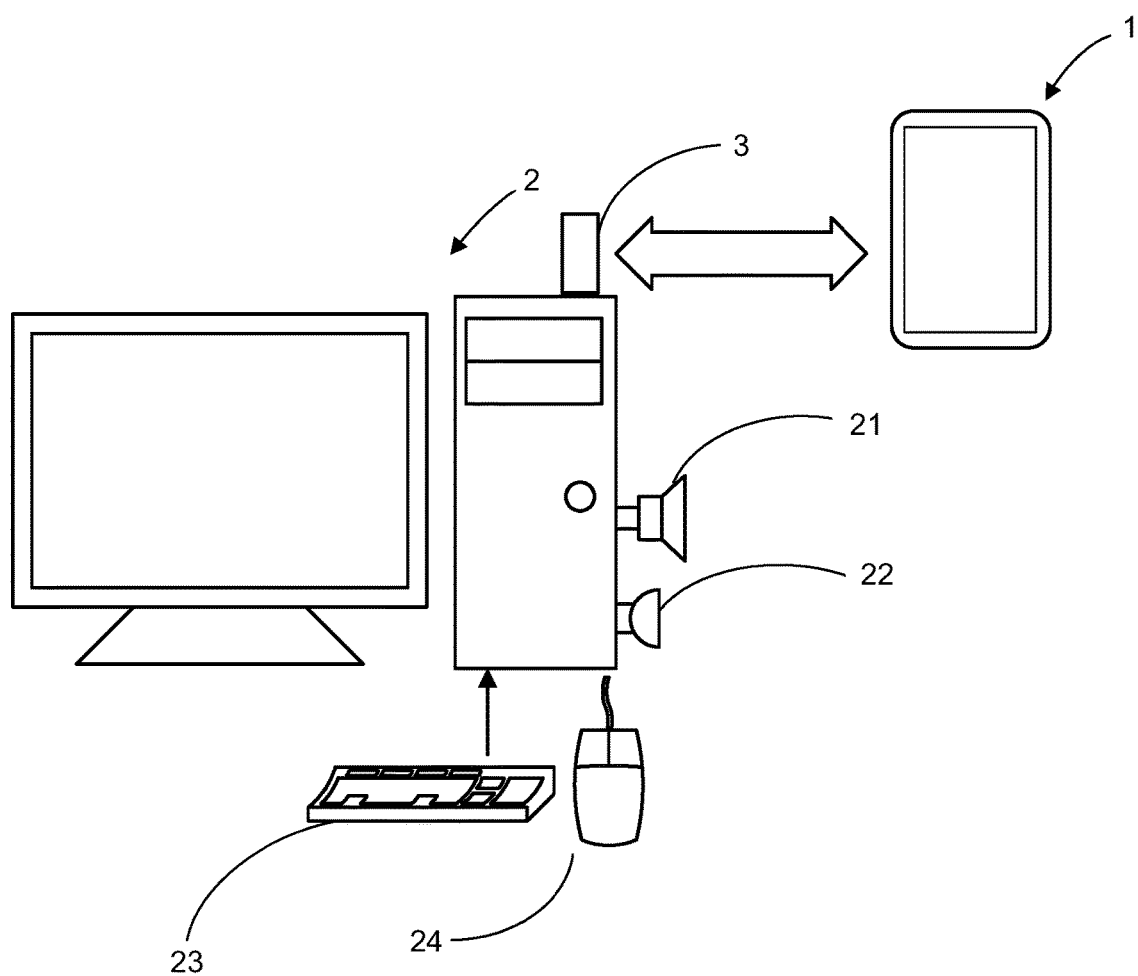
FIG. 1 is a schematic view of hardware arrangement of the invention.

Please refer to FIG. 1. The invention provides a method for making a host personal computer act as a BLUETOOTH accessory in a BLUETOOTH piconet. The method is applied between a personal computer (PC) 2 and a BLUETOOTH device 1. The PC 2 may be a desktop computer or a laptop computer with at least one USB (universal serial bus) port, UART (universal asynchronous receiver/transmitter) port, or SDIO (Secure Digital Input Output) port. The BLUETOOTH device 1 may be a smartphone or tablet computer with a BLUETOOTH function. Of course, the PC 2 is provided with peripherals such as a speaker 21, a microphone 22, a keyboard 23, and a mouse 24.

Figure 2:
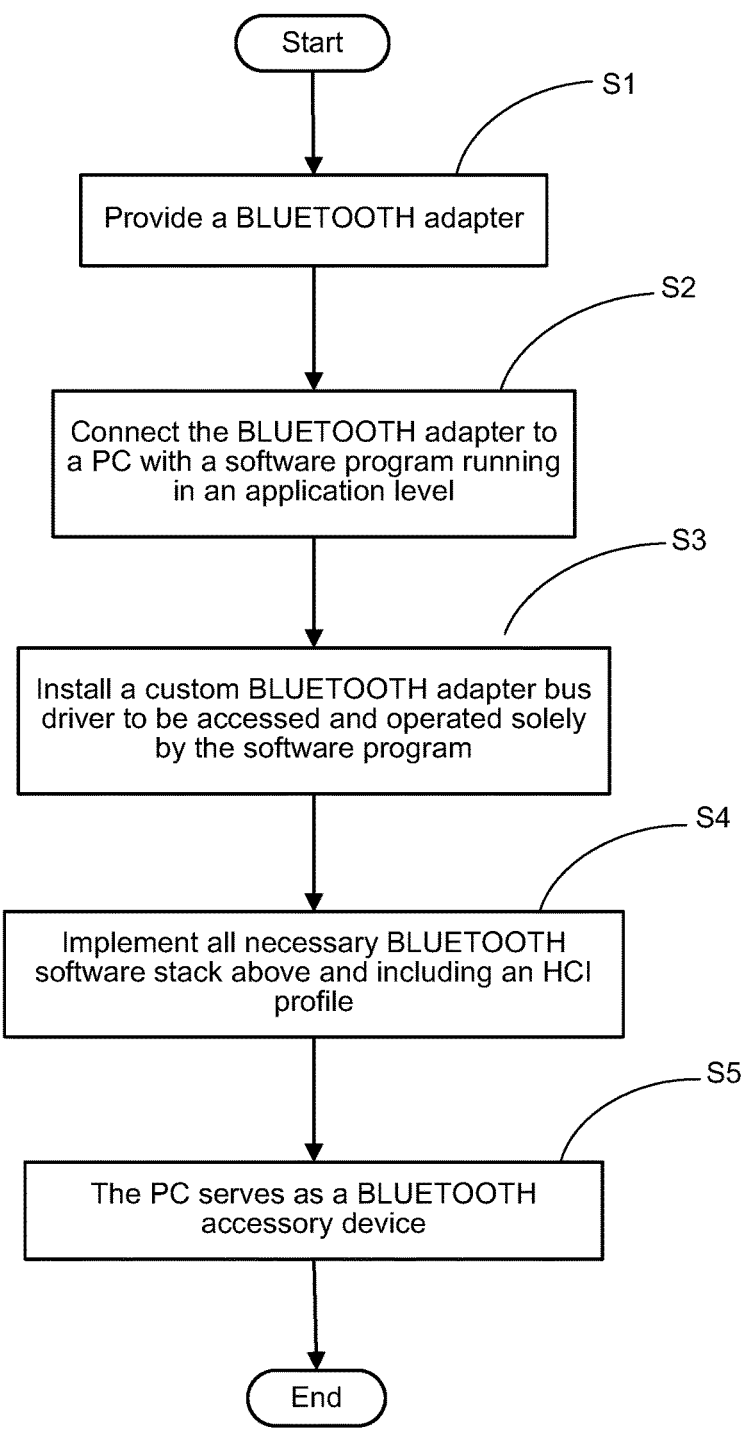
FIG. 2 is a flowchart of the method of the invention.

Please refer to FIG. 2, which shows a flowchart of the method of the invention. In step S1, a BLUETOOTH adapter 3 is provided. The BLUETOOTH adapter 3 is provided with a USB interface, a UART interface, or an SDIO interface for connecting a corresponding port of the PC 2. In general, the BLUETOOTH adapter 3 will be a dongle when it has a USB interface. The BLUETOOTH adapter 3 is provided with a BLUETOOTH function. In step S2, the BLUETOOTH adapter 3 is connected to a corresponding port of the PC 2 and is installed with a software program. The software program is running in an application level. In step S3, the software program installs a custom BLUETOOTH adapter bus driver to access and operate solely by itself. In step S4, the software program implements all necessary BLUETOOTH software stack above and including the HCI (Host to Controller Interface) profiles.

While each implementation has specific requirements that are detailed in the BLUETOOTH specification, the BLUETOOTH core system architecture has many consistent elements. The system includes an RF transceiver, baseband and protocol stacks that enable devices to connect and exchange a variety of classes of data.

The BLUETOOTH device 1 exchanges protocol signaling according to the BLUETOOTH specification. Core system protocols are the radio (RF) protocol, link control (LC) protocol, link manager (LM) protocol and logical link control and adaptation protocol (L2CAP), all of which are fully defined in the BLUETOOTH specification.

The lowest three system layers—the radio, link control and link manager protocols—are often grouped into a sub-system known as the BLUETOOTH controller. This is a common implementation that uses an optional standard interface—the Host to Controller Interface (HCI)—that enables two-way communication with the remainder of the BLUETOOTH system, called the BLUETOOTH host. The step S4 implements all necessary BLUETOOTH software stack above and including the HCI, namely, the logical link control and adaptation protocol (L2CAP), the RFCOMM (Radio Frequency Communications) and the SDP (Service Discovery Protocol).

The BLUETOOTH application profiles include, but not limited to, HID (human interface device), HFP (Hand-Free Profile), A2DP (Advanced Audio Distribution Profile), and BLE (BLUETOOTH low energy). All the mentioned software stack is implemented in an application level instead of a driver level.

Finally, in step S5, the PC 2 is switched to serve as a BLUETOOTH accessory device in the piconet after step S4 and can be used to wirelessly connect other BLUETOOTH devices. As a result, the peripherals of the PC 2, such as the speaker 21, the microphone 22, the keyboard 23, and the mouse 24 can become accessory devices of the BLUETOOTH device 1.

In sum, by the method of the invention, a personal computer 2 can be automatically and stably switched to serve as an accessory device in a BLUETOOTH piconet. This is very helpful for those users who connect their handheld computers to a personal computer through BLUETOOTH.

It will be appreciated by persons skilled in the art that the above embodiment has been described by way of example only and not in any limitative sense, and that various alterations and modifications are possible without departure from the scope of the invention as defined by the appended claims.

What is claimed is:

1. A method for making a personal computer act as an accessory in BLUETOOTH piconet, comprising:
   a) providing a BLUETOOTH adapter;
   b) connecting the BLUETOOTH adapter to the personal computer (PC) with a software program running in an application level;
   c) installing a custom BLUETOOTH adapter bus driver to be accessed and operated solely by the software program;
   d) implementing all necessary BLUETOOTH software stack above and including a BLUETOOTH Host to Controller Interface (HCI) profile; and
   e) the PC serving as a slave device, wherein the slave device is adapted to be an accessory device for a handheld computer, wherein the PC plays both Bluetooth host and accessory roles simultaneously.

2. The method of claim 1, wherein the BLUETOOTH adapter has a USB (universal serial bus) interface, UART (universal asynchronous receiver/transmitter) interface, or SDIO (Secure Digital Input Output) interface.

3. The method of claim 2, wherein the BLUETOOTH adapter is a dongle when it has a USB interface.

4. The method of claim 1, wherein step d) further comprises implementing a plurality of protocols, wherein the protocols comprise, an L2CAP (logical link control and adaptation protocol), an RFCOMM (Radio Frequency Communications) and an SDP (Service Discovery Protocol).

5. The method of claim 1, wherein step d) further comprises implementing a plurality of BLUETOOTH application profiles, wherein the BLUETOOTH application profiles comprise, an HID (human interface device), HFP (Hand-Free Profile), A2DP (Advanced Audio Distribution Profile), and BLE (BLUETOOTH low energy).

* * * * *